United States Patent
Samueli et al.

(10) Patent No.: US 7,302,013 B2
(45) Date of Patent: Nov. 27, 2007

(54) MULTI-MODE VARIABLE RATE DIGITAL SATELLITE RECEIVER

(75) Inventors: Henry Samueli, San Juan Capistrano, CA (US); Alan Y. Kwentus, Irvine, CA (US); Thomas D. Kwon, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 758 days.

(21) Appl. No.: 10/747,931

(22) Filed: Dec. 30, 2003

(65) Prior Publication Data

US 2004/0151263 A1    Aug. 5, 2004

Related U.S. Application Data

(63) Continuation of application No. 09/013,964, filed on Jan. 27, 1998, now Pat. No. 6,714,608.

(51) Int. Cl.
*H03K 9/00* (2006.01)

(52) U.S. Cl. .................. 375/316; 375/329; 375/261; 375/235; 329/304

(58) Field of Classification Search .............. 375/316, 375/261, 235, 329; 329/304
See application file for complete search history.

(56) References Cited

U.S. PATENT DOCUMENTS

| | | | |
|---|---|---|---|
| 4,131,766 A | | 12/1978 | Narashima |
| 4,608,540 A | * | 8/1986 | Tsuchiya et al. ............ 329/306 |
| 5,375,146 A | * | 12/1994 | Chalmers .................... 375/350 |
| 5,418,815 A | | 5/1995 | Ishikawa et al. |
| 5,440,268 A | | 8/1995 | Taga et al. |
| 5,504,455 A | * | 4/1996 | Inkol .......................... 329/304 |
| 5,504,785 A | | 4/1996 | Becker et al. |
| 5,511,235 A | * | 4/1996 | Duong et al. ................. 455/75 |
| 5,640,416 A | * | 6/1997 | Chalmers .................... 375/147 |
| 5,640,670 A | | 6/1997 | Samueli et al. |
| 5,654,774 A | | 8/1997 | Pugel et al. |
| 5,793,818 A | | 8/1998 | Claydon et al. |
| 5,812,927 A | | 9/1998 | Ben-Efraim et al. |
| 5,844,948 A | | 12/1998 | Ben-Efraim et al. |

(Continued)

OTHER PUBLICATIONS

Gardner, Floyd. M. "Interpolation in Digital Modems-Part 1: Fundamentals." IEEE Trans. on Communications, vol. 41, No. 3, Mar. 1993, pp. 501-507.

(Continued)

*Primary Examiner*—Temesghen Ghebretinsae
*Assistant Examiner*—Juan A. Torres
(74) *Attorney, Agent, or Firm*—Sterne, Kessler, Goldstein & Fox P.L.L.C.

(57) ABSTRACT

Digital signal processing for television signals includes digital feedback loops. Analog information signals are oversampled to provide digital signals. The digital signals are introduced to a digital carrier recovery loop and a digital symbol recovery loop. The gain of the digital signals is also regulated in a feedback loop. The digital signals are processed to recover the data in the data signals. The use of digital feedback loops allows information recovered from the digital signals to be precise. Carrier signals can be directly demodulated to produce baseband inphase and quadrature signals, or first downconverted to produce intermediate frequency signals.

9 Claims, 9 Drawing Sheets

U.S. PATENT DOCUMENTS

| | | |
|---|---|---|
| 5,870,439 A | 2/1999 | Ben-Efraim et al. |
| 5,898,900 A | 4/1999 | Richter et al. |
| 5,953,636 A | 9/1999 | Keate et al. |
| 5,995,563 A | 11/1999 | Ben-Efraim et al. |
| 6,154,871 A | 11/2000 | Claydon et al. |

OTHER PUBLICATIONS

Gardner, F.M.; L. Erup; & R. A. Harris. "Interpolation in Digital Modems-Part II: Implementation and Performance." IEEE Trans. on Communications, vol. 41, No. 6, Jun. 1993, pp. 998-1008.

* cited by examiner

MULTI-MODE VARIABLE RATE DIGITAL SATELLITE RECEIVER

CROSS-REFERENCE TO RELATED APPLICATION(S)

This application is a continuation of application Ser. No. 09/013,964, filed on Jan. 27, 1998 now U.S. Pat. No. 6,714,608, the disclosure of which is incorporated herein by reference.

FIELD OF THE INVENTION

This invention relates to a system for, and method of receiving information (e.g., video and/or data) signals such as those transmitted by a satellite from a plurality of stations each operative in an individual frequency range and for recovering the information represented by the information signals.

BACKGROUND

Satellites have been in existence for a number of years for receiving signals in space from a plurality of television stations and for transmitting these signals to a subscriber on the ground. Each of the television stations provides signals in an individual range of frequencies. For example, the encoded digital signals from the different television stations may have different data rates in a range between approximately two megabits/second (2 Mb/s) to approximately ninety megabits/second (90 Mb/s).

The satellites receive the signals from the different television stations in the frequency range of approximately 2-90 Mb/s and modulate these signals with a carrier signal having a suitable frequency such as a frequency in the range of approximately nine hundred and fifty megahertz (950 MHz) to approximately twenty one hundred and fifty megahertz (2150 MHz). The satellites then transmit the modulated carrier signals to television receivers on the ground.

The television receivers then convert the carrier signals to signals at an intermediate frequency such as approximately four hundred and eighty megahertz (480 MHz). These intermediate frequency signals are then demodulated at the television receivers and the demodulated signals are processed to recover the data signals from the individual ones of the television stations. The processing of the signals occurs on an analog basis.

It is well recognized that the processing of the signals on an analog basis to recover the data in the data signals is not as precise as would ordinarily be desired. The recovery of such data on a precise basis by analog techniques is especially difficult in view of the fact that the data signals may occur in a range of frequencies as great as approximately two megabits/second (2 Mb/s) to approximately ninety megabits/second (90 Mb/s).

SUMMARY

Carrier signals are modulated by information (video and/or data) signals in a particular frequency range. The information signals are oversampled at a first frequency greater than any of the frequencies in the particular frequency range to provide digital signals at a second frequency.

The digital signals are introduced to a carrier recovery loop which provides a feedback to regulate the frequency of the digital signals at the second frequency. The digital signals are also introduced to a symbol recovery loop which provides a feedback to maintain the time for the production of the digital signals in the middle of the information signals. The gain of the digital signals is also regulated in a feedback loop. The digital signals are processed to recover the data in the data signals. By providing digital feedbacks, the information recovered from the digital signals can be quite precise. In one embodiment, the carrier signals are demodulated to produce baseband inphase and quadrature signals. The inphase and quadrature signals are then oversampled and regulated in the feedback loops as described above.

In a second embodiment, the carrier signals are downconverted to produce intermediate frequency signals which are oversampled to produce the digital signals at the second frequency without producing the inphase and quadrature signals. The oversampled signals are then regulated in the feedback loops as described above.

In a third embodiment, the carrier signals are oversampled without being downconverted or producing the inphase and quadrature signals.

DETAILED DESCRIPTION

Figure 1:
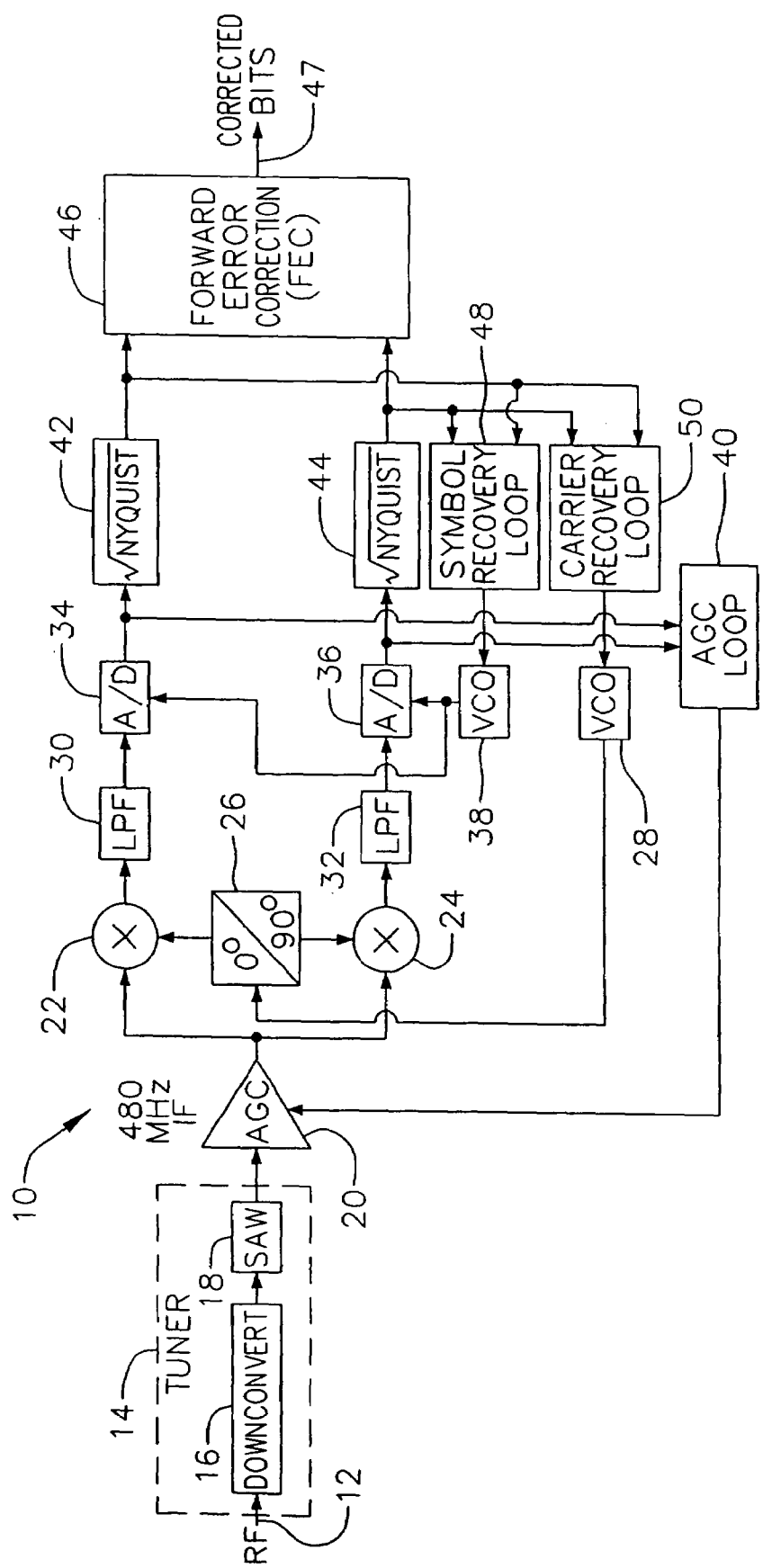
FIG. 1 is a block diagram of a prior art receiver operative on an analog basis for receiving signals from a satellite and for recovering the information represented by such signals.

FIG. 1 is a circuit diagram, primarily in block form, of a "Traditional Receiver Architecture" generally indicated at 10 and known in the prior art for use by a television subscriber for receiving signals from a satellite and for processing such signals to recover the information (e.g., video images) or data represented by such signals. The "Traditional Receiver Architecture" shown in FIG. 1 operates primarily on an analog basis to process the received signals and recover the information or data represented by such signals.

The system 10 shown in FIG. 1 includes a line 12 for receiving radio frequency (RF) carrier signals from a satellite (not shown) in a conventional manner. These carrier signals may have a suitable frequency such as nine hundred and fifty megahertz (950 MHz) or twenty one hundred and fifty megahertz (2150 MHz). The carrier signals received on the line 12 may be modulated by information (e.g., video and/or data) signals at a particular frequency in a frequency range such as approximately two megabits/second (2 Mb/s) to approximately ninety megabits/ second (90 Mb/s). The particular frequency in this frequency range is dependent upon the particular television station which is being received by the subscriber at any instant. Only one (1) frequency is selected at any one time by the system shown in FIG. 1 for receiving data and processing such information.

The signals on the line 12 are introduced to a tuner 14 which is shown within broken lines in FIG. 1. The tuner 14 includes a downconvert stage 16 and a surface acoustic wave filter (SAW) 18. The stage 16 converts the signals at the carrier frequency to signals at an intermediate frequency such as approximately four hundred and eighty megahertz (480 MHz). The surface acoustic wave stage 18 constitutes a band pass filter which passes signals only to a particular frequency such as approximately four hundred and eighty megahertz (480 MHz).

The signals from the tuner 14 pass to an automatic gain control stage 20. The signals from the automatic gain control stage 20 are in turn introduced to a pair of multipliers 22 and 24 which also respectively receive sine and cosine signals from a stage 26. The operation of the stage 26 is controlled by a voltage controlled oscillator 28 having a center frequency at the intermediate carrier frequency of approximately 480 MHz.

The outputs of the multipliers 22 and 24 are respectively connected to low pass filters (LPF) 30 and 32. Connections are respectively made from the filters 30 and 32 to analog-to-digital (A/D) converters 34 and 36, the operations of which are controlled by the output from a voltage controlled oscillator 38. The outputs from the converters 34 and 36 are introduced to the input of an automatic gain control loop 40, the output of which controls the operation of the automatic gain control stage 20.

The outputs of the converters 34 and 36 also respectively pass to filters 42 and 44 which may constitute suitable low pass filters such as Nyquist filters 42 and 44. The outputs from the filters 42 and 44 are in turn introduced to a forward error correction (FEC) stage 46, the output from which on a line 47 constitutes the information represented by the information signals modulating the carrier signals.

The outputs from the filters 42 and 44 are also introduced to stages 48 designated as a "Symbol Recovery Loop" and to stages 50 designated as a "Carrier Recovery Loop." The output from the Symbol Recovery Loop 48 controls the operation of the voltage controlled oscillator 38 and the output from the Carrier Recovery Loop 50 controls the operation of the voltage controlled oscillator 28.

The carrier signals modulated by the data signals are received on the line 12. The modulated carrier signals are converted to an intermediate frequency (IF) of approximately 480 MHz by the tuner 14 and the if signals are provided with a gain control as at 20. Inphase and quadrature components of these IF signals are then respectively produced in the multipliers 22 and 24. The carrier signals at the IF frequency are then removed from these signals at 30 and 32 so that only the information signals with the inphase and quadrature components remain.

The information signals passing from the filters 30 and 32 with the inphase and quadrature components are respectively converted to digital signals at a particular frequency in the converters 34 and 36. The low frequency components of the digitized signals then respectively pass through the Nyquist filters 42 and 44. Errors in the low frequency signals passing through the filters 42 and 44 are then corrected in the forward error correction stage 46. The operation of the stage 46 is providing such corrections is known in the prior art.

The signals from the filters 42 and 44 may be considered to constitute baseband signals respectively including the inphase and quadrature components. These signals are introduced to the carrier recovery loop 50 which detects changes in the phases of such signals and produces voltage variations representing such phase changes. These voltage variations produce changes in the frequency of the signals from the voltage controlled oscillator 28. Such changes in frequency in turn cause changes to occur in the frequencies of the inphase and quadrature signals in stage 26. In this ways the operation of the stage 26 is regulated so that the sine and cosine signals from such stage coincide in frequency with the frequency of the signals from the stage 20.

The baseband signals from the filters 42 and 44 are also introduced to the symbol recovery loop 48. The loop 48 detects changes in the phases of these signals and produces voltage variations representing such phase changes. Such voltage variations produce changes in the frequency of the signals from the voltage controlled oscillator 38. Such changes in frequency in turn cause changes to occur in the times at which the converters 34 and 36 operate to produce the digital signals. In this way, the analog-to-digital signals are produced in the middle of the times that the information signals are produced. This assures that the analog signals will be digitally sampled at the times when the analog signals represent valid information (e.g., data bits).

Figure 2:
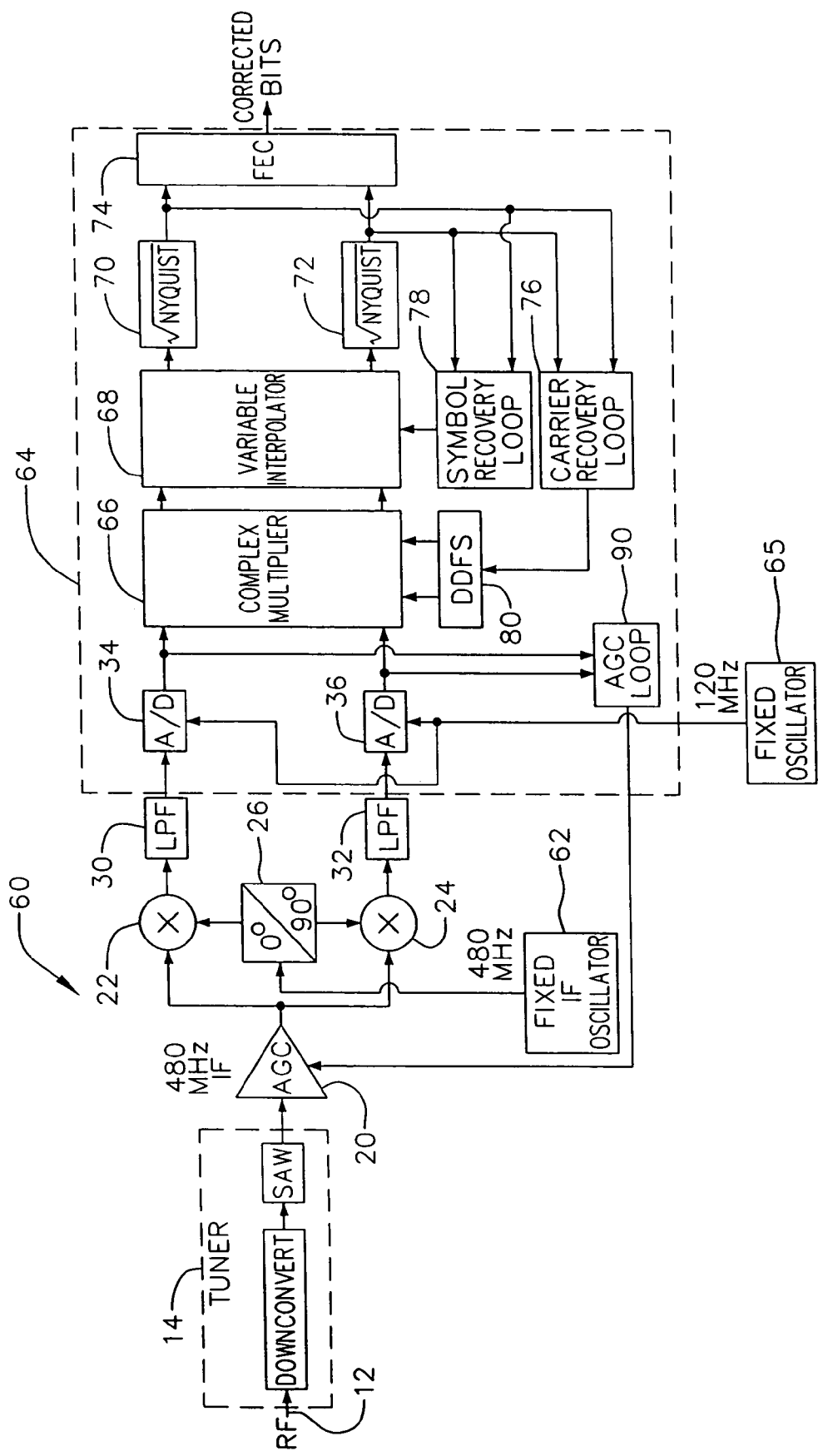
FIG. 2 is a block diagram of a receiver constituting one embodiment of the invention for receiving signals from a satellite and for processing such signals, primarily on a digital basis, to recover the information represented by such signals.

FIG. 2 shows, primarily in block form, a receiver generally indicated at 60 and constituting one embodiment of the invention. One primary way in which the embodiment shown in FIG. 2 differs from, and is superior to, the embodiment shown in FIG. 1 is that the embodiment shown in FIG. 2 provides digital feedback loops. Another primary way in which the embodiment shown in FIG. 2 differs from, and is superior to, the embodiment shown in FIG. 1 is that the embodiment shown in FIG. 2 is able to recover information from information signals in a frequency range as wide as approximately two megabits/second (2 Mb/s) to approximately ninety megabits/second (90 Mb/s). This cannot be accomplished by the analog system shown in FIG. 1.

The embodiment shown in FIG. 2 includes the line 12, the tuner 14 and the automatic gain control stage 20. The signals from the stage 20 are introduced to the multipliers 22 and 24 as in the embodiment shown in FIG. 1. The multipliers 22 and 24 also respectively receive sine and cosine signals from the stage 26. However, the stage 26 receives signals at the IF frequency (such as approximately 480 MHz) from an intermediate frequency (IF) oscillator 62. An advantage of the system shown in FIG. 2 is that the frequency of the signal from the oscillator 62 does not have to be precise.

The baseband signal from the multiplier 22 passes through the filter 30 which introduces the low frequency components of this signal to the analog-to-digital converter 34. In like manner, the signal from the multiplier 24 passes through the filter 32 which introduces the low frequency components of this signal to the analog-to-digital converter 36. The converters 34 and 36 are shown as being disposed within a broken rectangle 64. The broken rectangle indicates an integrated circuit chip. All of the stages within the rectangle 64 and on the chip are digital.

The signals from the filters 30 and 32 are in the data rate range of approximately two megabits/second (2 Mb/s) to approximately 90 megabits/second (90 Mb/s). The different frequencies in this range represent signals transmitted from different television stations and retransmitted by the satellite to the subscriber. A fixed oscillator 65 introduces free running signals to the converters 34 and 36 at a frequency at least twice the bandwidth of the information signals in the frequency range of approximately 1 megahertz (1 MHz) to approximately 45 megahertz (45 MHz). For example, the signals from the fixed oscillator 65 may be at a somewhat precise frequency such as approximately one hundred and twenty megahertz (120 MHz). This causes the oscillator 65 to oversample the information signals even at the highest frequency in such frequency range. In this way, the information signals are sampled several times in each cycle even at the highest frequency in the frequency range.

The signals from the converters 34 and 36 pass to a complex multiplier 66 the construction of which will be described in detail subsequently. The outputs from the complex multiplier 66 are in turn introduced to a variable interpolator 68. Output connections are respectively made from the variable interpolator 68 to Nyquist filters 70 and 72 respectively corresponding to the filters 42 and 44 in FIG. 1. The outputs from the filters 70 and 72 are connected to a forward error correction stage 74 corresponding to the stage 46 in FIG. 1.

The outputs from the filters 70 and 72 are also introduced to a carrier recovery loop 76 and a symbol recovery loop 78. Each of the loops 76 and 78 operates on a digital basis. The carrier recovery loop 76 may include a phase detector for detecting phase errors and may also include a loop filter. The output from the carrier recovery loop 76 passes to a direct digital frequency synthesizer (DDFS) 80 which may be a numerically controlled oscillator. The oscillator introduces sine and cosine signals to the complex multiplier 66.

The symbol recovery loop 78 may be constructed in a manner similar to the construction of the carrier recovery loop 76 and may be considered to include a phase detector, a loop filter and a numerially controlled oscillator. A connection is made from the output of the symbol recovery loop 78 to the variable interpolator 68. The outputs of the converters 34 and 36 are connected to an automatic gain control (AGC) loop 90 which introduces signals to the AGC stage 20 to regulate the gain of the analog signals at the IF frequency of 480 MHz. The AGC loop 90 operates on a digital basis.

The signals from the filters 70 and 72 are introduced to the carrier recovery loop 76 which detects changes in the phases of such signals and produces signals representing such changes in phase. These signals are filtered in the loop filter in the loop 76 and the filtered signals are introduced to the digital frequency synthesizer 80 to produce changes in the frequency of the signals from the synthesizer. Sine and cosine components of such signals are introduced from the synthesizer 80 to the complex multiplier 66 which combines these signals with the inphase and quadrature components of the digitized data signals from the converters 34 and 36. In this way, the signals from the complex multiplier 66 are maintained at the frequency of the information signals even though the frequency of the signals from the oscillator 62 is not precise.

In like manner, the symbol recovery loop 78 detects changes in the phases of the signals from the filters 70 and 72 and produces signals representing such changes in phase. These signals are filtered in the loop filter in the loop 78 and the filtered signals are introduced to the digital frequency synthesizer in the loop 78 to produce changes in the frequency of the signals from the synthesizer. These signals cause the sampling of the digital signals to be provided in the middle of the period of time that each of the information signals is produced.

The AGC loop 90 operates digitally to regulate the gain of the signals from the tuner 14 at the intermediate frequency of approximately 480 MHz. As will be appreciated, a digital system is more precise than an analog system. This causes the variable interpolator 68 to provide an enhanced operation in the system shown in FIG. 2 and described above because there is essentially no variation in the gain of the signals from the AGC stage 20.

Furthermore, the operation of the AGC loop 90 is enhanced because the signals introduced to the AGC loop have an error frequency. This error frequency results from the fact that the frequency of the signals from the IF oscillator 62 is not precise. As will be appreciated from the previous discussion, this error frequency is eliminated by the operation of the carrier recovery loop 76.

The digital system shown in FIG. 2 has additional advantages over the analog system shown in FIG. 1. The digital system shown in FIG. 2 is able to recover the information from information signals in a range of frequencies as low as approximately two megabits/second (2 Mb/s) and as high as approximately ninety megabits/second (90 Mb/s). This is accomplished in part by oversampling the analog signals from the filters 30 and 32 with the oscillator (e.g. at 120 MHz) at a frequency considerably greater than any of the frequencies in the range of approximately 1 MHz to approximately 45 MHz.

It is desirable that the complex multiplier 66 precede the variable interpolator 68. This results in part from the fact that the IF oscillator 62 is not precise. For example, if the IF oscillator 62 provides an error such as approximately five megahertz (5 MHz) and the information signals have a bandwidth of approximately one megahertz (1 MHz), the complex multiplier 66 could not correct for the five megahertz (5 MHz) error if the complex multiplier 66 followed the variable interpolator 68, since the sampling rate at the outputs of the variable interpolator would be approximately two megahertz (MHz).

Figure 3:
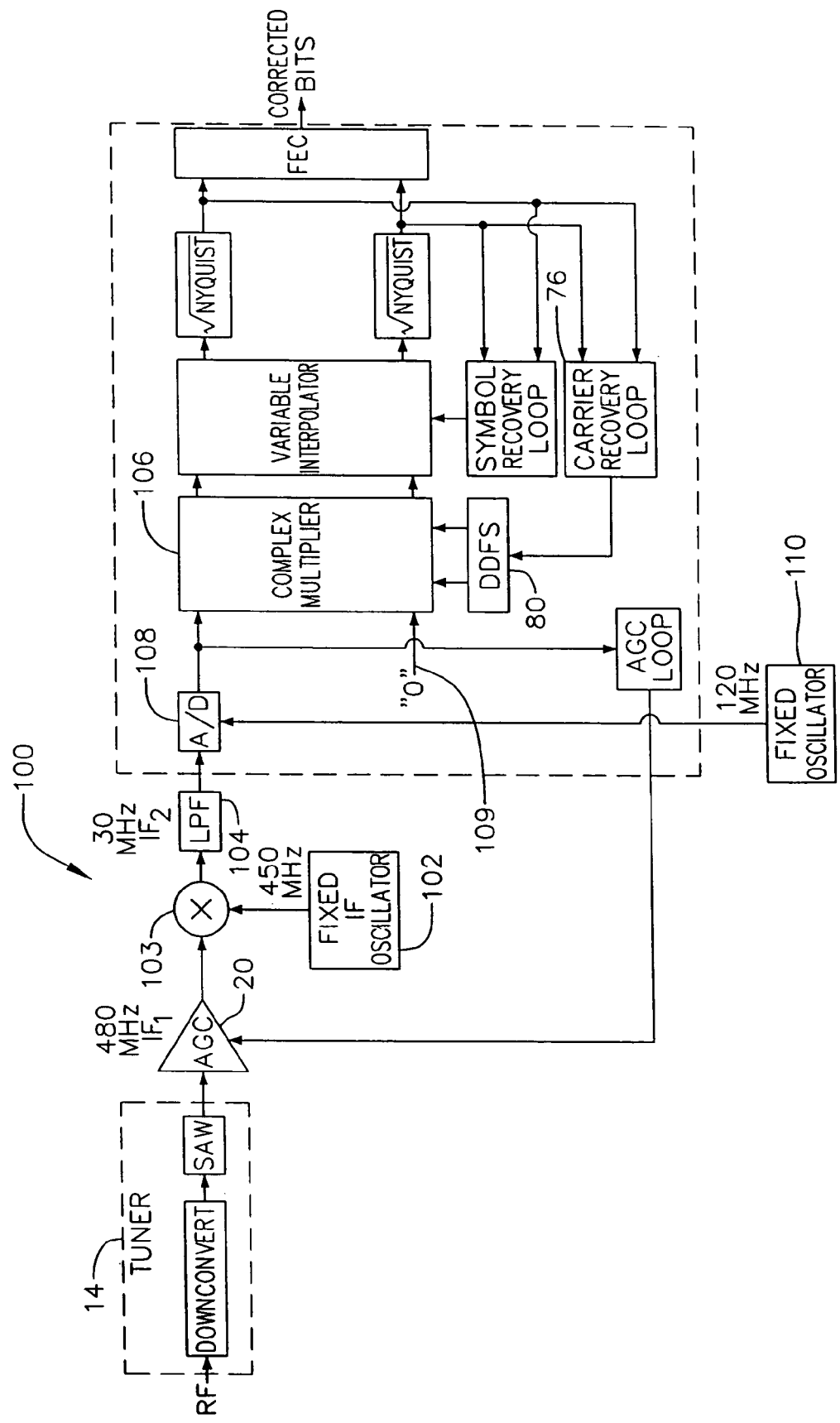
FIG. 3 is a block diagram of a receiver constituting a second embodiment of the invention, simplified in several respects relative to the embodiment shown in FIG. 2, for receiving signals from a satellite and for processing such signals, primarily on a digital basis, to recover the information represented by such signals.

FIG. 3 shows another embodiment, generally indicated at 100, of the invention. This embodiment is similar to the embodiment shown in FIG. 2 in a number of respects. Because of this, like components or stages in FIG. 3 are given the same numerical indications as in the embodiment shown in FIG. 2. However, in the embodiment shown in FIG. 3, a fixed oscillator 102 providing signals at a suitable frequency such as approximately four hundred and fifty megahertz (450 MHz) is connected to an input terminal of a multiplier 103, another input terminal of which is connected to the automatic gain control stage 20. The output from the multiplier 103 is accordingly at a frequency of approximately thirty megahertz (30 MHz). The output from the multiplier 103 is introduced to a low pass filter corresponding to the low pass filter 30 in FIG. 2.

Another difference between the embodiments shown in FIGS. 2 and 3 is that a complex multiplier 106 corresponding in FIG. 3 to the complex multiplier 66 in FIG. 2 receives the output from an analog-to-digital converter 108 corresponding to the converter 34 is FIG. 2. A second input to the complex multiplier 106 in FIG. 3 constitutes a "0" signal on a line 109. The "0" indication turns off one side of the complex multiplier 106 so that the inphase and quadrature components of the digitally converted signals are not provided to the complex multiplier, but rather the digitalized second intermediate frequency ($IF_2$) signal is provided to the complex multiplier.

The oscillator 110 preferably operates at a suitable frequency such as approximately one hundred and twenty megahertz (120 MHz). Since the signals introduced to the converter 108 are at a suitable frequency such as approximately thirty megahertz (30 MHz), the oscillator 110 oversamples on a 4:1 basis the signals introduced to the converter.

As will be seen, sine and cosine components are produced only at the outputs of the digital frequency synthesizer 80. This is in the digital domain. Since the sine and cosine components are produced only in the digital domain, the down conversion from the IF frequency of 480 MHz to 30 MHz does not have to be precise. One reason is that the carrier recovery loop 76 provides precision in the frequencies provided to the complex multiplier 106. In view of this, the frequency of the oscillator 110 does not have to be as precise as the frequency of the oscillator 38 in FIG. 1.

Figure 4:
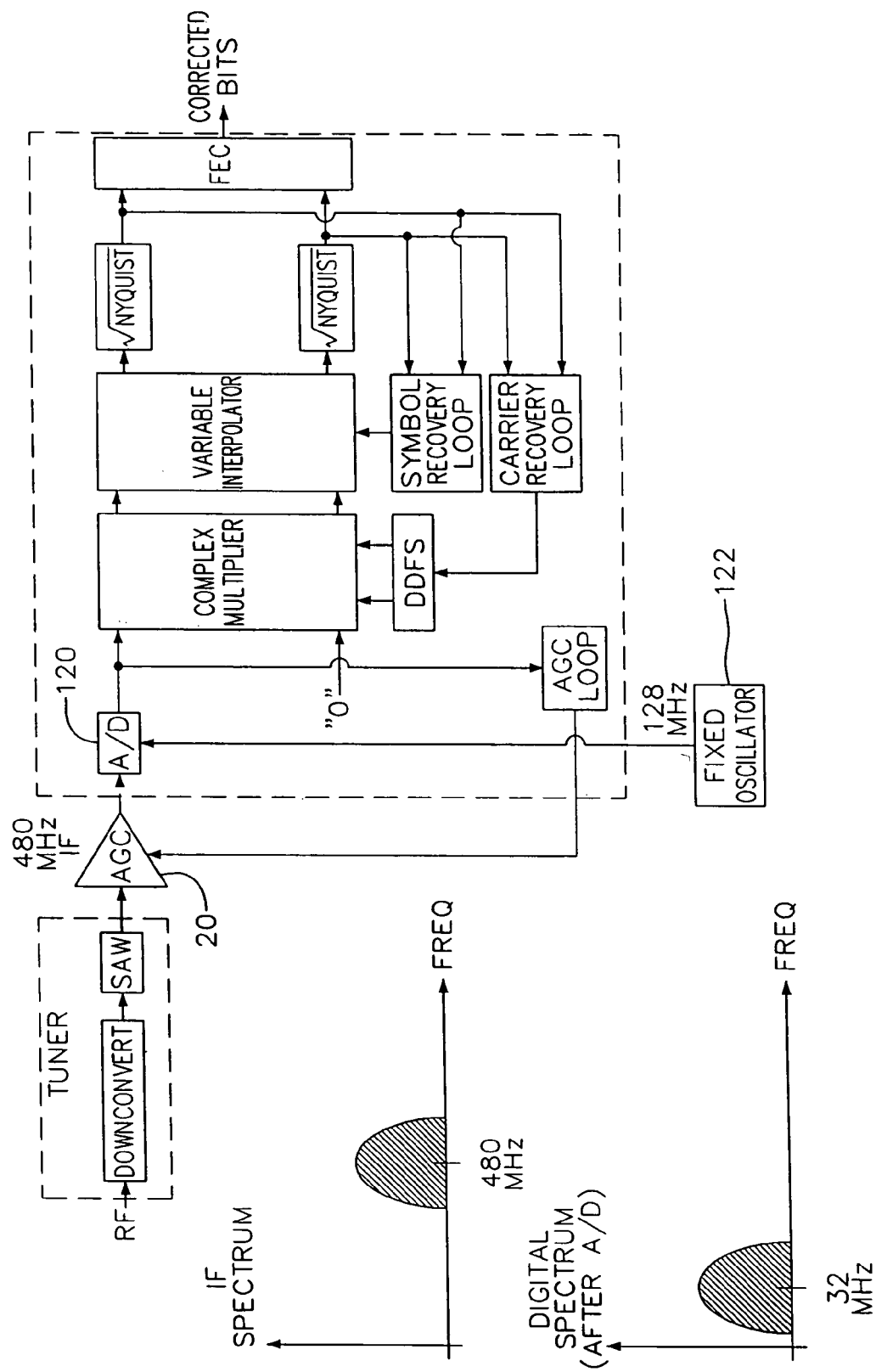
FIG. 4 is a block diagram of a receiver constituting a third embodiment of the invention, simplified relative to the embodiments shown in FIGS. 2 and 3, for receiving signals from a satellite and for processing such signals, primarily on a digital basis, to recover the information represented by such signals.

FIG. 4 shows an embodiment which is even simpler in construction than the embodiment shown in FIG. 3. In the embodiment of FIG. 4, the fixed oscillator 102, the multiplier 103 and the low pass filter 104 shown in FIG. 3 are eliminated. Furthermore, a fixed oscillator 122 is provided with a suitable frequency such as 128 MHz and signals from this oscillator are introduced to an analog-to-digital converter 120 corresponding to the converter 108 in FIG. 3. As a result, the signals at 480 MHz from the automatic gain control stage 20 are sampled at a frequency of approximately one hundred and twenty eight megahertz (128 MHz) in the analog-to-digital converter 120 which produces a digital signal at a second IF frequency of 32 MHz. As will be appreciated, the beat frequency of thirty-two (32 MHz) is obtained from the following relationship: 4(128)−480=32. This process is known as "sub-sampling".

Figure 10:
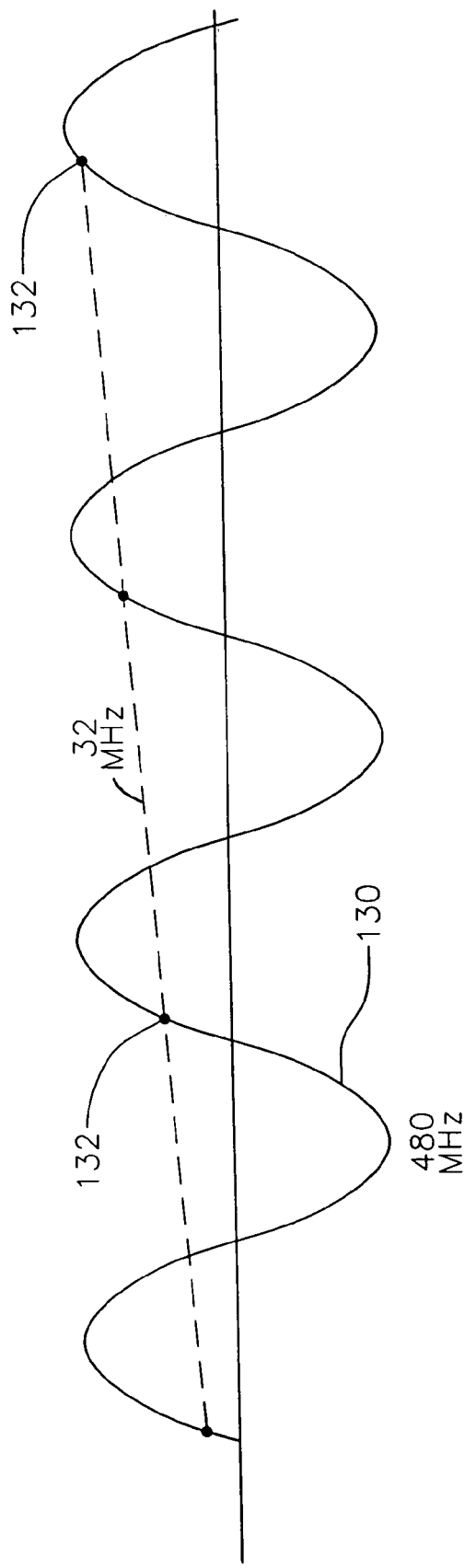
FIG. 10 provides voltage wave forms indicating how the circuitry shown in FIG. 4 operates to produce signals at a suitable frequency such as approximately thirty-two megahertz (32 MHz).

FIG. 10 illustrates how a beat frequency is obtained by introducing signal at 480 MHz and 128 MHz to the converter 120. The signal at 480 MHz is illustrated schematically at 130 in FIG. 10. The sampling at the frequency of 128 MHz causes signals to be produced at a frequency of 32 MHz. The signals at the frequency of 32 MHz are indicated schematically in FIG. 10 by dots 132.

Figure 5:
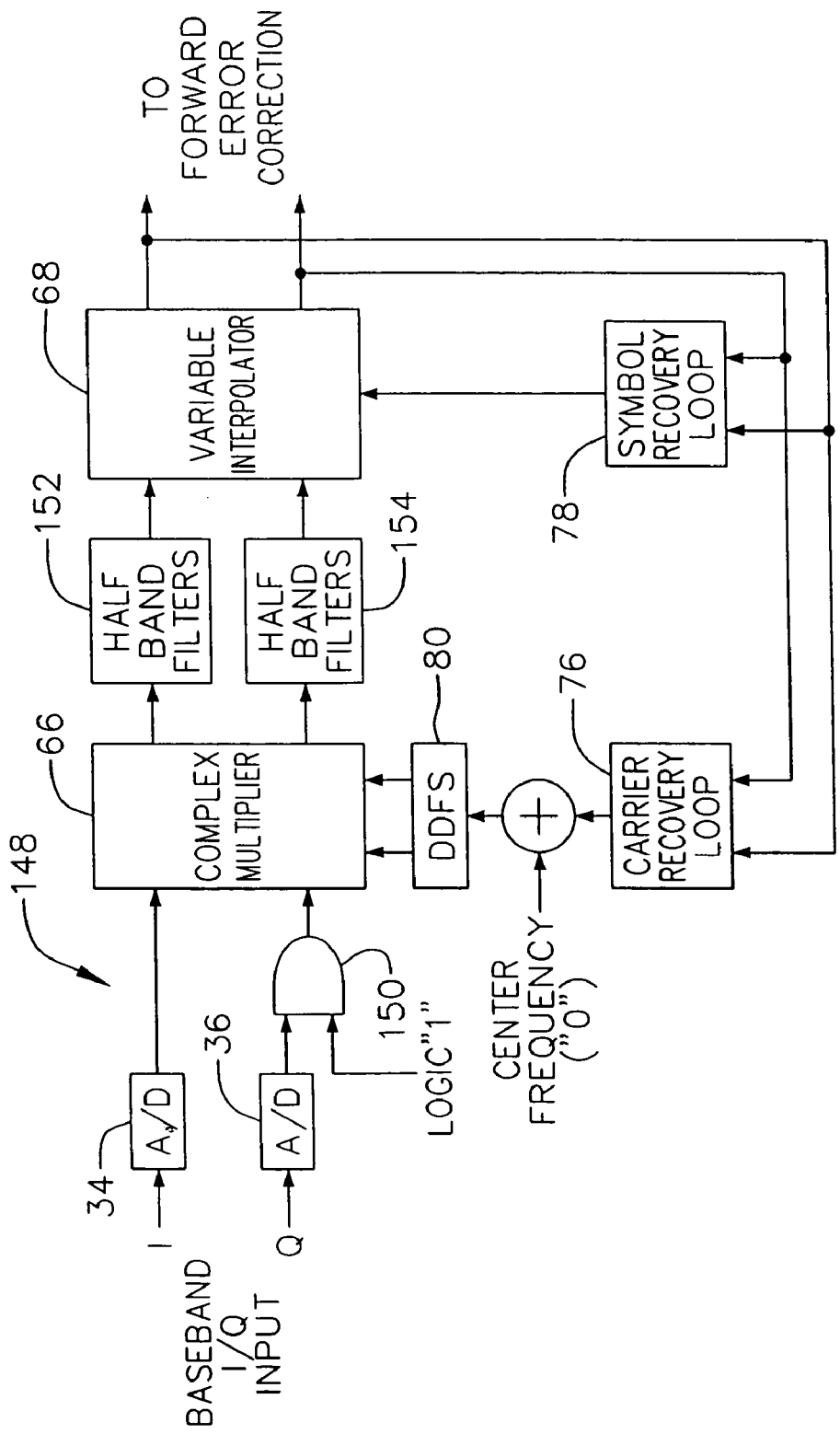
FIG. 5 is a block diagram showing in additional detail certain of the stages included in the receiver represented by the block diagram of FIG. 2.

FIG. 5 illustrates in additional detail certain of the features in the system of FIG. 2. The sub-system shown in FIG. 5 and generally indicated at 148 includes the analog-to-digital converters 34 and 36, the complex multiplier 66, the variable interpolator 68, the carrier recovery loop 76, the symbol recovery loop 78 and the digital frequency synthesizer 80 also shown in FIG. 2. The converters 34 and 36 are shown as respectively receiving "I" and "Q" signals. The "I" and "Q" signals respectively indicate baseband inphase and quadrature signals.

An "and" network 150 is shown in FIG. 5 as having one input connected to the converter 36 and another input connected to receive a binary "1". The binary "1" indicates that the output from the converter 36 is introduced to the complex multiplier 66. Half band filters 152 and 154 are shown in FIG. 5 as being connected between the complex multiplier 66 and the variable interpolator 68. As will be seen from the following discussion with respect to FIG. 9, each of the half band filters 152 and 154 divides the frequency range of 1-45 MHz into reduced frequency bands. One of these frequency bands is then selected in accordance with the individual one of the television channels selected for viewing by the subscriber.

Figure 6:
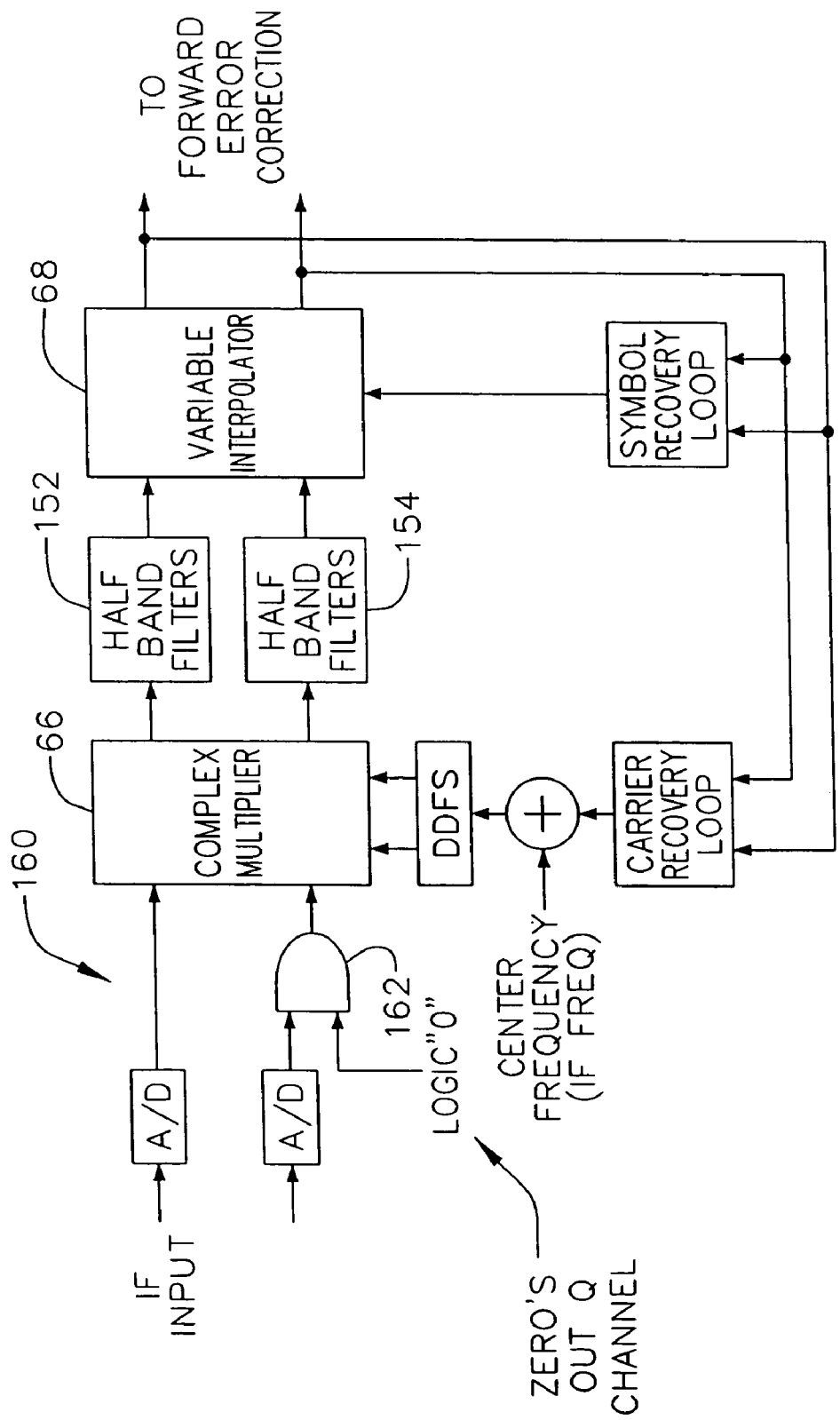
FIG. 6 is a block diagram showing in additional detail the same stages as are shown in FIG. 5 when such stages are modified for inclusion in the receivers represented by the block diagrams of FIGS. 3 and 4.

The sub-system shown in FIG. 6 and generally indicated at 160 is intended to be used with the embodiments shown in FIGS. 3 and 4. The sub-system 160 in FIG. 6 is similar to the sub-system 148 in FIG. 5 except that the "and" gate 162 corresponding to the "and" gate 150 in FIG. 5 receives a logic "0" 1 on one of its inputs. Because of this, the quadrature signal is not introduced to the complex multiplier 66.

Figure 9:
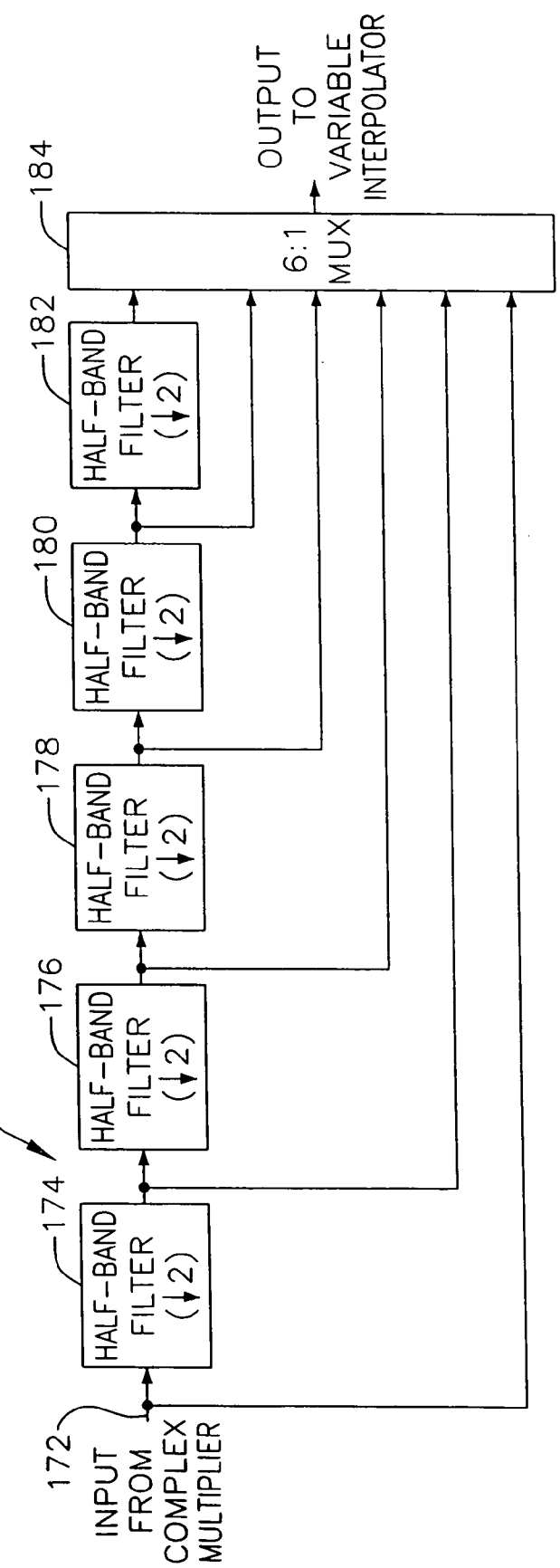
FIG. 9 is a circuit diagram in block form and shows in additional detail the construction of half band filters shown in block form in FIGS. 5 and 6.

FIG. 9 illustrates the half band filters 152 and 154 in additional detail. One of the half band filters 152 and 154 is generally indicated at 170 in FIG. 9. The other one of the half band filters 152 and 154 is constructed in a similar manner. In FIG. 9, a line 172 is provided to receive the signals from the complex multiplier 68. A plurality of half band filters 174, 176, 178, 180 and 182 are connected in series with the line 172 and with one another. The output from the line 172 and from the filters 174, 176, 178, 180 and 182 is connected to a 6:1 multiplexer 184.

The line 172 and each of the half band filters pass information signals at an individual range of symbol rates. Each of the filters 174, 176, 178, 180 and 182 passes signals at symbol rates one half of the rate introduced to the previous filters in the chain. This may be seen from the following table:

| Output | Symbol Rate in Megabaud |
|---|---|
| Line 172 | 22.5-45.0 |
| Filter 174 | 11.25-22.5 |
| Filter 176 | 5.625-11.25 |
| Filter 178 | 2.8125-5.625 |
| Filter 180 | 1.40625-2.8125 |
| Filter 182 | 0.703125-1.40625 |

The output from only one of the line 172 and the filters 174, 176, 178, 180 and 182 can pass through the multiplexer 184 at any instant.

Figure 7:
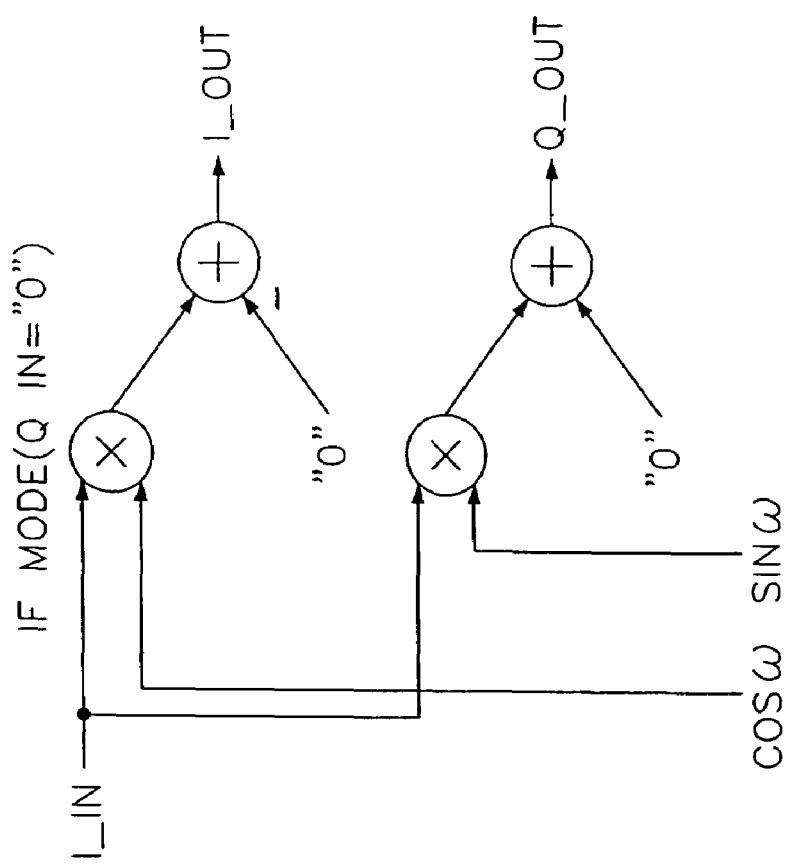
FIG. 7 is a circuit diagram showing in additional detail the construction of a complex multiplier shown in block form in FIG. 5.

FIG. 7, shows in additional detail the construction of the complex multiplier 66 in the embodiment shown in FIG. 2. In the embodiment shown in FIG. 7, the outputs from the converters 34 and 36 are respectively shown on lines 200 and 202. The output on the line 200 is introduced to multipliers 204 and 208 and the output on the line 202 is introduced to multipliers 206 and 210.

The multipliers 204 and 210 receive a second input from an output line 212 from the digital frequency synthesizer 80 and the multipliers 206 and 208 receive a second input from an output line 214 from the digital frequency synthesizer 80. The inputs to the multipliers 204 and 210 represent a cosine function and the inputs to the multipliers 206 and 208 represent a sine function.

Connections are made from the outputs of multipliers 204 and 206 to a subtracter 212. The output from the subtracter 212 is introduced through a line 214 to the half band filter 152 in FIGS. 5 and 6. In like manner, the outputs from the multipliers 208 and 210 are introduced to an adder 216 in FIG. 7. The output from the adder 216 passes through a line 218 to the half band filter 154 in FIGS. 5 and 6.

Figure 8:
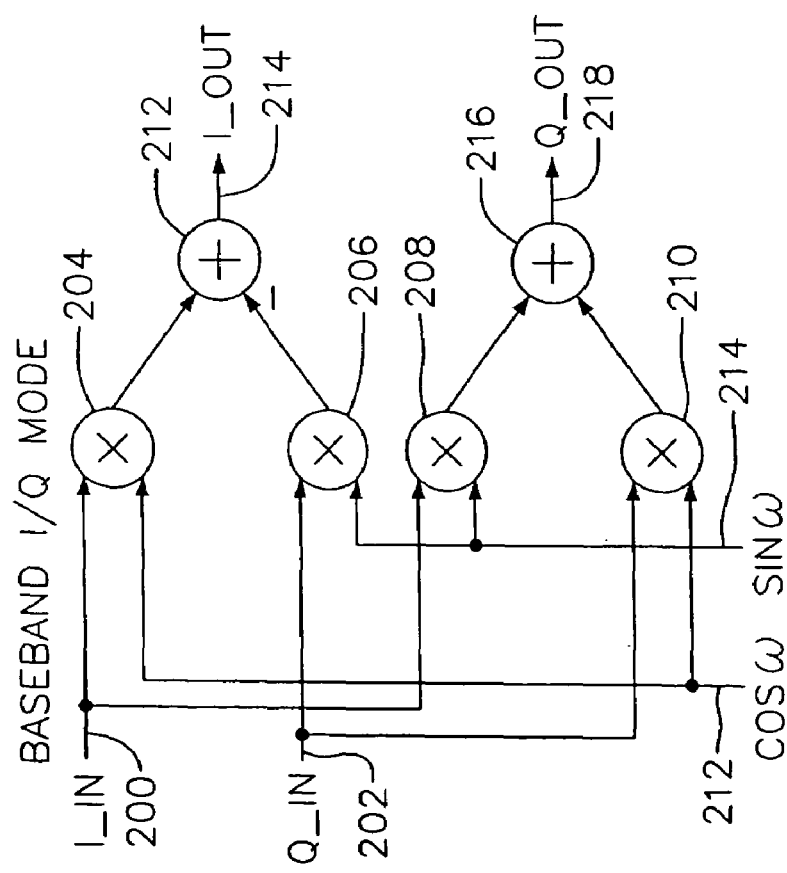
FIG. 8 is a circuit diagram showing in additional detail the construction of a complex multiplier shown in block form in FIG. 6.

FIG. 8 shows in additional detail the complex multiplier 66 in FIGS. 3 and 4. As will be appreciated from the showing in FIGS. 5 and 6 and from the above discussion, the Q output on the line 202 is zero. This is represented by the introduction of a "0" to the subtracter 212 and adder 216. In this way, the embodiment shown in FIG. 8 does not provide inphase and quadrature functions.

A variable interpolator for use as the variable interpolator 68 is known in the prior art. The variable interpolator 68 may be constructed in accordance with the disclosures of any of the following publications:

Gardner, Floyd M., "Interpolation in Digital Modems—Part I: Fundamentals", IEEE Transactions on Communications, No. 3, March 1993.

Harris Fred. "On the Relationship Between Multirate Polyphase FIR Filters and Windowed, Overlapped, FFT Processing", Proceedings of the Twenty-Third Asilomar Conference on Signals, Systems and Computers, Oct. 30-Nov. 1, 1989.

Harris, Fred, et al. "Modified Polyphase Filter Structure for computing Interpolated Information As Successive Differential Corrections", Proceedings of the 1991 International Symposium on Circuits and Systems, Singapore, 11-14 Jun., 1991.

Crochiere, Ronald E. and Rabiner, Laurence R., Multirate Digital Signal Processing; Englewood Cliffs, N.J.: Prentice Hall 1983.

U.S. Pat. No. 5,504,785—Mar. 2, 1996—Digital Receiver for Variable Symbol Rate Communication, Inventors: Donald W. Becker, Fred Harris, James E. Tiernan.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A method of recovering information from a received signal comprising:
   receiving a carrier signal modulated with the information;
   downconverting the carrier signal using a first fixed frequency oscillator to generate a downconverted signal; and
   processing, using a digital integrated circuit, the downconverted signal to generate an output signal representing the information, the processing including:
      sampling the downconverted signal using a second fixed frequency oscillator to generate a digital signal;
      regulating by a first digital feedback loop a frequency at which the output signal is generated, the first feedback loop carrying out processes of complex multiplication, variable interpolation, carrier recovery and digital frequency synthesizing to generate multiplying signals for the complex multiplication, and
      regulating, by a second digital feedback loop, a sampling time associated with the output signal, the second digital feedback loop carrying out processes of variable interpolation, and a symbol recovery, the processes of carrier recovery and symbol recovery both receiving signals resulting from variable interpolation.

2. The method of claim 1 wherein the downconverted signal is a baseband signal.

3. The method of claim 1 wherein the downconverted signal is an IF signal.

4. The method of claim 1 wherein the downconverted signal comprises in-phase and quadrature components.

5. A method of recovering information from a received signal comprising:
   receiving a carrier signal modulated with information;
   processing, using a digital integrated circuit, the modulated carrier signal to generate an output signal representing the information, the processing including:
      subsampling the carrier signal using a fixed frequency oscillator to generate at least one digital IF signal;
      regulating by a first digital feedback loop a frequency at which the output signal is generated, the first feedback loop carrying out processes of complex multiplication, variable interpolation, carrier recovery and digital frequency synthesizing to generate multiplying signals for the complex multiplication, and
      regulating, by a second digital feedback loop, a sampling time associated with the output signal, the second digital feedback loop carrying out processes of variable interpolation, and a symbol recovery, the processes of carrier recovery and symbol recovery both receiving signals resulting from variable interpolation.

6. A method of recovering information from a received signal modulated with that information, comprising:
   receiving a signal modulated with an information signal;
   multiplying the received signal using signals derived from a first fixed oscillator to generate a downeonverted signal having in-phase and quadrature components;
   filtering the downconverted signal;
   processing, using a digital integrated circuit, the downconverted signal to generate an output signal representing the information, the processing including:
      sampling the in-phase and quadrature components of the downconverted signal using a second fixed frequency oscillator to generate a digital signal having in-phase and quadrature components;
      regulating by a first digital feedback loop a frequency at which the output signal is generated, the first feedback loop carrying out processes of complex multiplication, variable interpolation, carrier recovery and digital frequency synthesizing to generate multiplying signals for the complex multiplication, and
      regulating, by a second digital feedback loop, a sampling time associated with the output signal, the second digital feedback loop carrying out processes of variable interpolation, and a symbol recovery, the processes of carrier recovery and symbol recovery both receiving signals resulting from variable interpolation.

7. The method of claim 6 wherein the complex multiplying process multiplies the in-phase and quadrature components of the digital signal with signals generated by the digital frequency synthesizing.

8. The method of claim 6 wherein the quatrature information signals comprises at least one baseband signal.

9. The method of claim 6 wherein the quatrature information signals comprises at least one IF signal.

* * * * *